E. LESCHBRANDT.
SOUND REPRODUCING RECORD.
APPLICATION FILED JUNE 2, 1906.

908,683.

Patented Jan. 5, 1909.

WITNESSES:

INVENTOR
Einar Leschbrandt
BY
Chas A. Cutter
ATTORNEY

UNITED STATES PATENT OFFICE.

EINAR LESCHBRANDT, OF PHILADELPHIA, PENNSYLVANIA.

SOUND-REPRODUCING RECORD.

No. 908,683.   Specification of Letters Patent.   Patented Jan. 5, 1909.

Application filed June 2, 1906. Serial No. 319,855.

*To all whom it may concern:*

Be it known that I, EINAR LESCHBRANDT, a subject of the King of Norway, and a resident of the city and county of Philadelphia, State of Pennsylvania, have invented certain new and useful Improvements in Sound-Reproducing Records, of which the following is a specification.

My invention relates to an improved sound reproducing record, and it consists of a strip of paper, or other suitable material, provided with an air pervious pattern corresponding in form to the sound wave or waves to be reproduced.

Sound is, or consists of, a series of rarefactions and condensations, of the air and, as is well known, rarefactions and condensations may, by means that are well known and which it will be unnecessary to describe here, be photographed or otherwise graphically represented upon a photograph plate or film or other article. The graphic representation of the sound waves appears as an irregular line. If the plate, film or strip carrying the irregular line representing the sound waves be perforated or otherwise made air pervious, to one side of said line, the sounds corresponding to said pattern may be reproduced by passing a current of air through said perforations.

Figure 1:
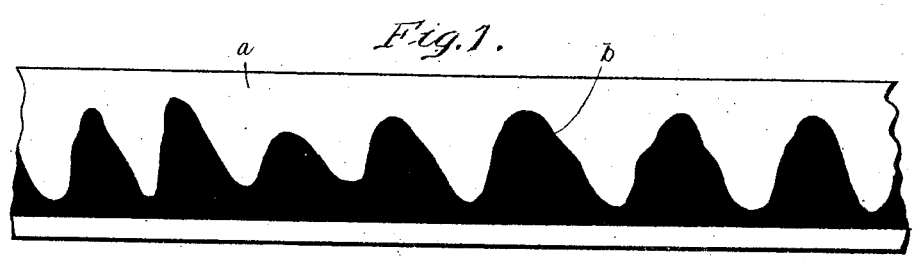
Figure 2:
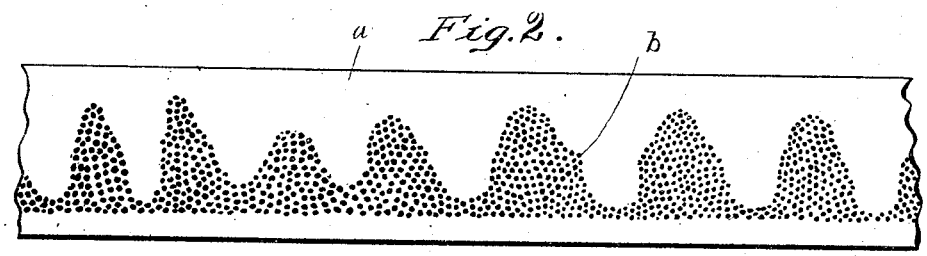

In the accompanying drawings Figure 1 represents a film or strip of material carrying a graphic representation of a sound wave, and Fig. 2, the same perforated.

*a* is a strip or ribbon of paper, or other suitable material, carrying a pictorial representation of the sound wave or waves to be reproduced. The representation of the sound waves may be formed in any suitable manner but for accuracy and convenience I prefer to form them photographically and to this end the strip or ribbon of paper is coated with, or is formed of, a photographic film which is exposed to a beam of light which, through suitable means not necessary to mention here, is made to vibrate in unison with the sounds. This beam of light being caused to impinge upon the moving film there will be recorded thereon the movements of the beam and the film being developed in the usual manner of photographic films or plates will show a figure *b* of irregular outline which will be in fact a photographic negative of the sounds.

To reproduce the sounds either the record itself, or a counterpart of it, which has been perforated as shown in Fig. 2, or otherwise made pervious to air, is drawn past an aperture through which air is drawn or blown, the result is a reproduction of the original sounds.

Having thus described my invention I claim:—

A sound reproducing record consisting of a strip of paper, or other suitable material, provided with an air pervious pattern corresponding in form to sound waves previously impressed or formed thereon, and adapted to the passage therethrough of a current of air.

EINAR LESCHBRANDT.

Witnesses:
GEORGE W. SELTZER,
CHARLES A. RUTTER.